United States Patent Office 2,860,334
Patented Nov. 11, 1958

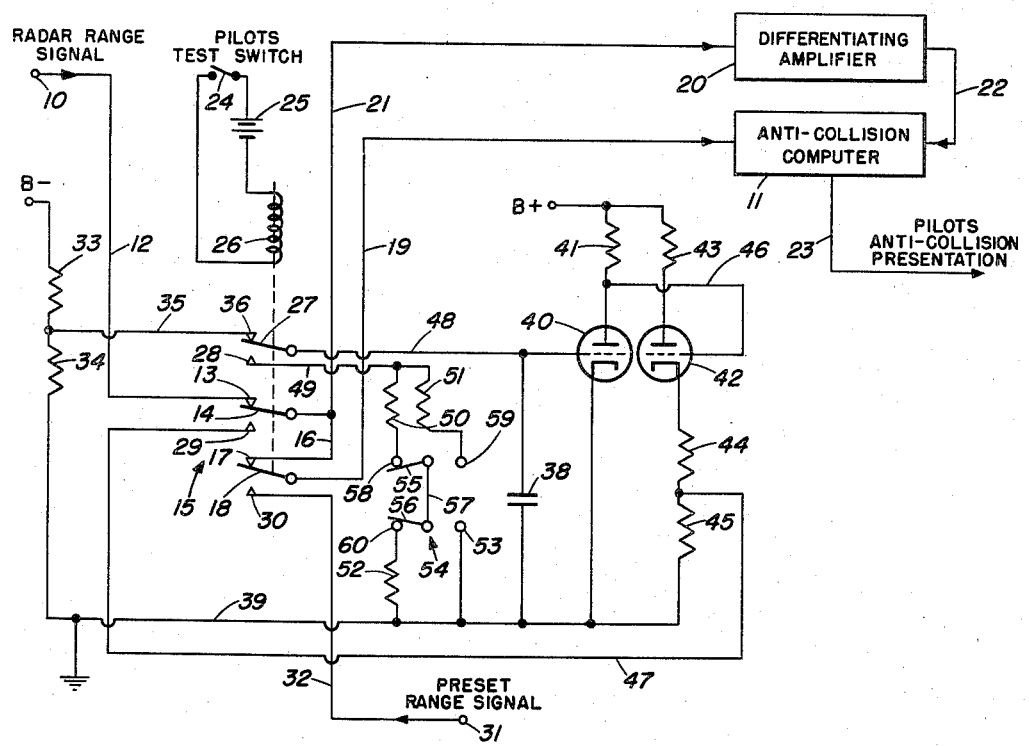
INVENTORS
ROBERT E. COWDERY
NORMAN R BROWN

2,860,334

ANTI-COLLISION COMPUTER TESTER

Robert E. Cowdery and Norman R. Brown, Glen Burnie, Md., assignors, by mesne assignments, to the United States of America as represented by the Secretary of the Navy Application July 21, 1954, Serial No. 444,933

8 Claims. (Cl. 343—17.7)

This invention relates to an airborne testing circuit for testing the accuracy of an aircraft anti-collision computer.

In military aircraft anti-collision computers are utilized to inform a pilot of an aircraft when to depart from a collision course with a target. One type of computer which is used for this purpose continuously computes the ratio of the range of a target to the rate of change of that range. When this ratio reaches a predetermined value the anti-collision computer actuates a relay which in turn provides a signal to the pilot of the aircraft informing him to depart from the collision course with the target. Under conditions where the pilot has no visual contact with the target, that is, when he is relying solely on radar data to fly a collision course with a target, the accurate operation of the anti-collision computer is especially critical in preventing the pilot from colliding with his target. Thus it becomes necessary not only to make certain that the anti-collision computer is operating properly to avoid collisions, but also to reassure the pilot of the aircraft of this fact for psychological reasons.

The instant invention discloses an airborne testing circuit for checking the accuracy of the above described type of anti-collision computer while an aircraft is in flight. Under normal operating conditions of the anti-collision computer, a radar range signal is coupled to the anti-collision computer. The rate of change of the range is determined, and a ratio is obtained of the range to the rate of change of the range. In order to test the accuracy of the computer first switch means are provided, which can be manipulated by the pilot, for disconnecting the radar range signal from the anti-collision computer and substituting in its stead a range signal of known magnitude which is supplied by the testing circuit. The testing circuit also produces various changing signals which correspond to known changes in range. These changing signals are obtained from a capacitor selectively discharging across different resistors. The rate of change of the changing signals is obtained and applied to the anti-collision computer where the ratio of the preset range signal to the known rate of change of range is obtained. For certain known ratios, the anti-collision computer, if operating properly, will indicate that it is not yet time for the pilot to depart from a collision course with a target. For other known ratios, the anti-collision computer, if operating properly, will indicate that it is time for the pilot to depart from a collision course with a target. Thus by applying known ratios of range to rate of change in range to the anti-collision computer, certain of which will cause the computer to indicate that it is time to depart from a collision course and others of which will give no such indication, this invention provides the pilot of an aircraft with a "go-no go" type of testing device which will determine to the pilot's satisfaction whether his anti-collision computer is operating properly.

It is accordingly the object of this invention to disclose an airborne testing circuit for an aircraft anti-collision computer which is used for testing the accuracy of the latter while an aircraft is in flight.

Other objects and many of the attendant advantages of this invention will be readily appreciated as the same becomes better understood by reference to the following detailed description when considered in connection with the accompanying drawing.

In the accompanying drawing numeral 10 designates a terminal at which a radar range signal is applied to the anti-collision computer 11 from a radar set (not shown). This range signal is coupled to one input of anti-collision computer 11 through conductor 12; terminal 13 and armature 14 of switch 15; conductor 16; terminal 17 and armature 18 of switch 15; and conductor 19. This same radar range signal is coupled from the junction of armature 14 and conductor 16 to differentiating amplifier 20 by conductor 21. The differentiating amplifier 20 produces an output which is equivalent to the rate of change of the range. This output is coupled to anti-collision computer 11 by conductor 22. The anti-collision computer 11 produces an output which is equivalent to the ratio of the range to the rate of change of the range. This output is coupled by conductor 23 to suitable equipment (not shown) which will inform the pilot of the aircraft when to depart from a collision course with the target in order to avoid colliding with the target when this ratio reaches a predetermined value.

It will be noted that when switch 15 is in the position shown in the drawing that the range signal is coupled directly to the anti-collision computer in order to provide the pilot with anti-collision information. The testing circuit at this time is not coupled to the anti-collision computer 11.

When the pilot desires to test the accuracy of the anti-collision computer, while the aircraft is in flight, he closes the pilot's test switch 24 which completes a series circuit between battery 25 and solenoid coil 26. When solenoid coil 26 is energized it will cause armatures 27, 14 and 18, to contact terminals 28, 29 and 30, respectively, of switch 15. It can be seen that when this condition exists, that the radar range signal is no longer coupled to the anti-collision computer 11. Instead, a preset range signal of known magnitude is coupled from terminal 31 from a suitable source (not shown) through conductor 32, terminal 30, armature 18, and conductor 19 to one input of the anti-collision computer 11. Since the magnitude of the signal applied at terminal 31 is known, it is necessary to provide the anti-collision computer 11 with known changing signals which represent the rate of change of range between the aircraft and the target in order to test the accuracy of the anti-collision computer. This change of range signal is obtained in the following manner.

A voltage divider consisting of resistors 33 and 34 couples B— to ground. While switch 15 is in the position shown in the drawing, resistor 34 is coupled across capacitor 38 by conductor 35, terminal 36 and armature 27 of switch 15, conductor 48, and conductor 39. A charge is therefore developed on capacitor 38 which is equivalent to the voltage drop across resistor 34. It can be readily seen that the cathode and grid of triode 40 are coupled across capacitor 38. When switch 15 is in the position shown in the drawing, the grid of triode 40 is relatively negative and triode 40 is biased to cut-off. The plate of triode 40 is coupled to B+ through load resistor 41. A triode 42 has its grid coupled to B+ through load resistor 43 and its grid coupled to the plate of triode 40. The cathode of triode 42 is coupled to ground through cathode resistors 44 and 45 and conductor 39. When triode 40 is biased to cut-off its plate voltage is relatively positive. This positive plate voltage is applied to the grid to triode 42 through conductor 46. The grid of triode 42 is therefore relatively positive and this tube is conducting. The voltage at the junction of cathode resistors 44 and 45 is therefore at a relatively positive value. The junction of cathode resistors 44 and 45 is coupled to terminal 29 of switch 15 by conductor 47. It can readily be seen from the foregoing that when switch 15 is in the position shown in the drawings that a negative charge is built up on capacitor 38, and that the aforedescribed circuit operates in the aforedescribed manner.

As mentioned previously, when the pilot desires to test the accuracy of his anti-collision computer 11, he energizes solenoid coil 26 to cause the armatures 27, 14 and 18 of switch 15 to contact the terminals 28, 29, and 30 respectively. When this done, one side of capacitor 38 will be connected by conductor 48, armature 27, contact 28, and conductor 49 to one end of resistors 50 and 51. The other side of capacitor 38 will be connected through conductor 39 to one side of resistor 52 and to terminal 53 of switch 54. When switch 54 is in the position shown in the drawings, the armatures 55 and 56 couple resistors 50 and 52 through conductor 57 so that these resistors are positioned across capacitor 38. The armature 55 is selectively engageable with terminals 58 and 59 of switch 54. The armature 56 is selectively engageable with terminals 60 and 53 of switch 54. By the proper positioning of armatures 55 and 56 the following combinations of resistors can be placed across capacitor 38: resistors 50 and 52; resistors 51 and 52; resistor 50; and resistor 51. The sum of the magnitudes of resistor 51 and resistor 52 is greater than the sum of the magnitudes of resistors 50 and 52; and the magnitude of resistor 51 is greater than that of resistor 50. It can thus be seen that the rate of discharge of capacitor 38 is inversely proportional to the magnitude of the resistance which is selectively placed across capacitor 38 by switch 54. The rate of discharge of capacitor 38 is equivalent to the change in range of the aircraft from a target.

It can therefore be seen that when the switch 15 is in a position opposite to that shown in the drawings that charged capacitor 38 will begin a discharge across the resistors which are selectively placed across it. As the capacitor 38 discharges it will cause the grid of triode 40 to become more positive until triode 40 begins to conduct. The conduction of triode 40 will impress an increasingly lower voltage on the plate thereof which is in turn impressed on the grid of triode 42, which in turn will cause triode 42 to conduct less. The voltage at the junction of cathode resistors 44 and 45 will therefore steadily decrease. This steadily decreasing voltage is coupled through conductor 47, terminal 29, armature 14, and conductor 21 to the differentiating amplifier 20. The differentiating amplifier 20 provides an output which is proportional to the rate of change of the voltage at the junction of resistors 44 and 45. This rate of change of voltage output from amplifier 20 is equivalent to a rate of change of range which is obtained when a changing radar range signal is coupled thereto. The output of amplifier 20 is coupled to anti-collision computer 11. Also coupled to anti-collision computer 11, in the aforedescribed manner, is the preset range signal which is applied to terminal 31. Thus it can be seen that two known values corresponding to range and the rate of change of range can be applied to the anti-collision computer for testing purposes.

In the operation of the anti-collision computer a signal will be produced when the ratio of range to the rate of change of range becomes relatively small. Before this condition is reached, no signal will be obtained from the anti-collision computer. The testing circuit of this invention simulates actual conditions. Thus when a high resistor value is placed across capacitor 38, the rate of discharge of the capacitor is relatively small with respect to the range signal, and therefore the ratio of the preset range signal to the rate of change of the discharge of the capacitor 38 is a relatively high value, and the anti-collision computer will not be energized. On the other hand, when a relatively small resistor is selectively placed across capacitor 38, in the aforedescribed manner, the latter will discharge rapidly which in turn will cause the differentiating amplifier to produce an output which represents a high rate of change of range. When the ratio of range to the rate of change of range is compared by the computer, a relatively low value will be obtained which in turn will cause the anti-collision computer 11 to produce a signal. Varying values of resistance can be selectively placed across capacitor 38 by the use of switch 54 in the aforedescribed manner. It can thus be seen that the testing circuit of this invention acts as a "go-no-go" type of gage; that is, for certain predetermined conditions of the testing circuit a response will be obtained from the anti-collision computer, and for other conditions no response will be obtained.

It is to be noted that the grid of triode 40 is at a negative potential beyond tube cut-off when switch 15 is in the position shown in the drawing. When the test is actuated by depressing switch 24, the grid of triode will gradually become more positive in the aforedescribed manner. There is enough time delay inherent in the circuit which allows transients to die before the above described anti-collision test criteria are satisfied.

Obviously many modifications and variations are possible in the light of the above teachings. It is therefore to be understood that within the scope of the appended claims the invention may be practiced otherwise than as specifically described.

Having thus described our invention, we claim:

1. A circuit for testing an aircraft anti-collision computer, said computer producing a signal when the ratio of range of the aircraft from a target to the rate of change of that range reaches a predetermined value, the circuit comprising means for coupling a preset range signal of known magnitude to said anti-collision computer, means for producing a plurality of known signals which are equivalent to different rates of change of range of said preset range signal, and means for selectively coupling said known rate of change of range signals to said anti-collision computer, certain of said rate of change of range signals being of a certain magnitude so as not to cause an output from said anti-collision computer and other of said rate of change of range signals being of a certain magnitude so as to cause an output from said anti-collision computer whereby the accuracy of said anti-collision computer may be tested.

2. An airborne system for in-flight testing of the accuracy of an aircraft anti-collision computer, said computer producing a response when the ratio of the range of the aircraft from a target to the rate of change of that range reaches a predetermined value, the airborne system comprising: a first switch having first and second positions, a first terminal for connection to a radar range signal source, said switch coupling said first terminal to said anti-collision computer when it is in said first position, a second terminal for connection to a preset range signal source, first means for producing any one of a plurality of known change of range signals, said first switch coupling said second terminal and the output of said first means to said anti-collision computer when it is in said second position whereby the accuracy of said anti-collision computer may be determined.

3. An airborne system as set forth in claim 2 wherein said first means comprises a capacitor, a plurality of resistors, and a second switch for selectively placing certain of said resistors across said capacitor to give varying rates of discharge to said capacitor, each of said varying rates of discharge of said capacitor simulating a different change of range.

4. An airborne system as set forth in claim 3 including charging means for charging said capacitor, said charging means being operative when said first switch is in its first position, said capacitor discharging across said resistors when said first switch is in said second position.

5. A system as set forth in claim 4 including amplifying means operatively coupled to said capacitor for amplifying the signal produced thereby.

6. An anti-collision computer tester for an anti-collision circuit, said circuit comprising a first terminal adapted to be coupled to a radar range signal, a differentiating amplifier having an input and an output, a computer having first and second inputs and an output, the output of said amplifier being coupled to the second input of said computer, the tester comprising: first means for producing decaying D. C. voltages, a second terminal adapted to be coupled to a preset range signal, switch means operable in a first position to connect said first terminal to both the input of said amplifier and to the first input of said computer, and operable in a second position to connect said first means to the input of said amplifier and the second terminal to the first input of said computer, said computer producing an output signal when the ratio of a signal applied to the first input of said computer to the signal applied to the second input of said computer is below a predetermined value.

7. The tester of claim 6 wherein said first means is capable of selectively producing any one of a plurality of decaying D. C. approximately-linear waveforms, the tangent of each of which has a different value than that for any of the other waveforms.

8. The tester of claim 7 wherein said first means comprises: charge storage means, and resistance means for selectively producing various values of resistance, said charge storage means being placed across a source of D. C. charging voltage by said first connection of said first switch means and across said resistance means by said second connection.

References Cited in the file of this patent
UNITED STATES PATENTS

| | | |
|---|---|---|
| 2,478,208 | Rothman et al. | Aug. 9, 1949 |
| 2,549,473 | Jacob | Apr. 17, 1951 |
| 2,631,277 | Skoller | Mar. 10, 1953 |
| 2,706,285 | Scott | Apr. 12, 1955 |